United States Patent [19]

Culter et al.

[11] 4,247,869
[45] Jan. 27, 1981

[54] METHOD AND APPARATUS FOR IMPROVING RESOLUTION AND LINEARITY IN A BEAM-INDEX DISPLAY SYSTEM

[75] Inventors: Robert G. Culter, Seattle, Wash.; Charles S. Osborne, Jr., Beaverton, Oreg.

[73] Assignee: Tektronix, Inc., Beaverton, Oreg.

[21] Appl. No.: 30,261

[22] Filed: Apr. 16, 1979

[51] Int. Cl.³ .............................................. H04N 9/22
[52] U.S. Cl. ...................................................... 358/67
[58] Field of Search .................. 358/66, 67, 68, 71

[56] References Cited

U.S. PATENT DOCUMENTS 2,887,528  5/1959  Rhodes ............................... 358/67 X

OTHER PUBLICATIONS

MOS IC Handbook, National Semiconductor Corp., 1974, pp. 13.1–13.11, 7.1–7.6.

Primary Examiner—Robert L. Richardson
Attorney, Agent, or Firm—Thomas J. Spence

[57] ABSTRACT

A beam-index display system wherein a control signal representative of the position of an electron beam within a beam-index cathode-ray tube is employed to control concurrently both the generation and selection of video drive signals for transmission to the beam-producing apparatus of the tube.

6 Claims, 2 Drawing Figures

METHOD AND APPARATUS FOR IMPROVING RESOLUTION AND LINEARITY IN A BEAM-INDEX DISPLAY SYSTEM

BACKGROUND OF THE INVENTION

The subject matter of the present invention pertains to beam-index color display systems wherein an index signal generated within a beam-index cathode-ray display tube is employed to control the selection of digital information for display by the tube. For a detailed description of such tubes and systems, see, for example, A. M. Morrell et al, "Color Television Picture Tubes," Academic Press, New York, 1974, all pertinent parts of which are incorporated herein by this reference.

In a conventional beam-index display system, the index signal, generated by the electron writing beam as it moves across certain phosphor bands disposed over the faceplate of a beam-index cathode-ray display tube, is employed to control the sequential selection of portions of one or more video drive signals for successive transmission to the beam-producing apparatus of the tube in timed sequence with the movement across the phosphor bands, each drive signal being representative of a differentiable characteristic, usually color, of an image to be produced. Normally, the various phosphor bands are oriented vertically and disposed across the tube faceplate in a horizontal direction, the same direction as the beam movement. Since the index signal is a function of the position of the writing beam relative to that of the phosphor bands, its use to control the selection of the input drive signals ensures to a certain degree that each selected signal will be converted into a respective image component at a predetermined location on the tube faceplate. The beam-index concept is especially useful in the generation of high-resolution color images because of its ability to sequentially select portions of input signals representing various color characteristics of an image and present the selected signals to the display tube at the precise times that the writing beam is in position to impinge upon the corresponding bands of color phosphor.

A disadvantage of prior art beam-index display systems is that the index signal is employed to control only the selection of the input drive signals and not their initial generation. While such single quantization of the input drive signals is usually sufficient in an analog environment, for example, when processing a conventional television-type video signal of relative low resolution where a particular piece of color information may extend on the display screen over several bands of a respective color phosphor, it is less than sufficient in a high-resolution digital environment where a particular piece of color information may be destined for a particular phosphor band and, if not presented there at the precise instant that the writing beam is in position to affect the phosphor, be permanently or intermittantly lost.

SUMMARY OF THE INVENTION

The present invention is directed to a beam-index color display system wherein an index signal generated within a beam-index cathode-ray display tube is employed to control both the generation and selection of video drive signals representative of differentiable characteristics of an image to be produced. More particularly, the system of the present invention includes a beam-index cathode-ray tube, means for producing an index signal indicative of the position of an electron writing beam generated within the tube, means responsive to such index signal for generating a plurality of digital video drive signals representing differentiable characteristics of an image to be produced, and means also responsive to such index signal for sequentially selecting portions of such signals for transmission to and display by the beam-index tube.

Both the signal generating means and the signal selecting means are operated under timed control of the same index signal, or signals that are a function of the same index signal. The resultant double quantization of the input signal, that is, the generation of a quantity of video information at the precise instant that it is selected for display, ensures that the predetermined timed relationships among the generation of the image drive signals, the selection of the signals for display, and the position of the writing beam relative to the individual bands of display phosphor are maintained from signal generation to image display, and thereby that a particular quantum of unique information represented by a particular quantum of drive signal will be presented precisely and accurately at a particular location on the display screen.

It is, therefore, a principal objective of the present invention to provide an image-producing system capable of accurately and precisely presenting a particular quantum of image information at a particular location on the faceplate of a beam-index cathode-ray display tube.

It is an additional principal objective of the present invention to provide an image-producing system wherein both the generation and selection for display of a video drive signal are maintained in mutual timed synchronization.

It is a feature of the system of the present invention that the same index signal, or a derivative thereof, is employed to control both the generation and the selection of video drive signals representative of an image to be produced.

The foregoing objectives, features and advantages of the present invention will be more readily understood upon consideration of the following detailed description of the invention taken into conjunction with the accompanying drawings.

DESCRIPTION OF THE PREFERRED EMBODIMENT

Figure 1:
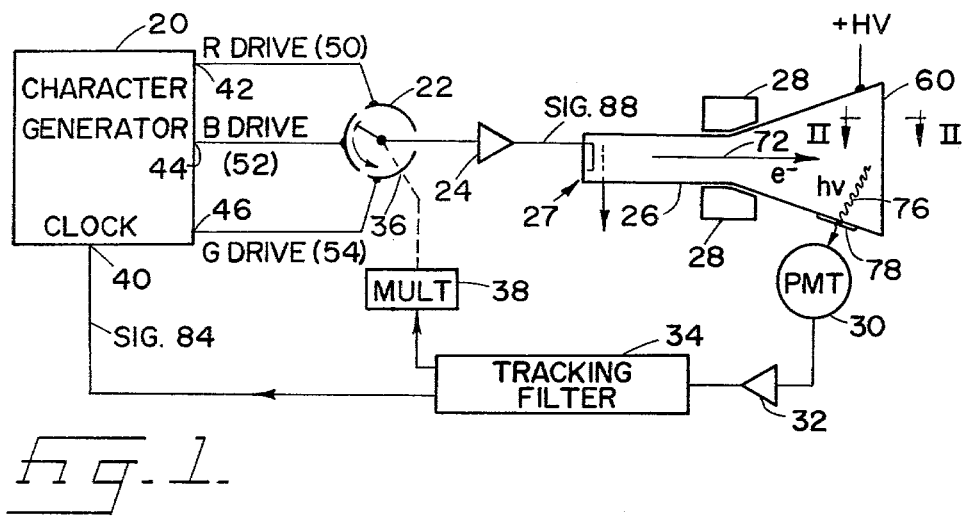
FIG. 1 is a schematic representation of a beam-index color display system according to the present invention.

Referring to FIG. 1, there is shown in simplified form a beam-index color display system including a digital character generator 20 for producing video drive signals representative of differentiable characteristics of an image to be produced, a z-axis commutator 22 for sequentially selecting the drive signals for transmission via a z-axis amplifier 24 to the beam-producing apparatus of a beam-index cathode-ray tube 26, a photomultiplier tube 30 for detecting an index signal produced within the tube 26, an index signal amplifier 32, and a phase-locked-looped tracking filter 34 for producing a frequency-modulated signal the phase of which is a function of that of the index signal. Note especially that the output of the tracking filter 34 is applied to both the cntrol input 36 of the commutator 22 and the clock input 40 of the character generator 20. A frequency multiplier circuit 38 may be placed in the signal path between the tracking filter 34 and the commutator for purposes described more fully below. As will be apparent to those persons skilled in the art, the system of FIG. 1, with the exception of the connection between the tracking filter 34 and the character generator 20, is conventional. Omitted from the figure for clarity are those other known circuits, such as power supplies, deflection amplifiers, timing circuits, and the like, necessary to form an operable system. Such circuits are conventional in nature and may be assumed herein for the purpose of complete disclosure.

In the discussion that follows, a basic understanding of beam-index tubes is assumed. For a detailed description of such tubes, see the Morrell et al reference cited in an earlier section of this specification.

Figure 2:
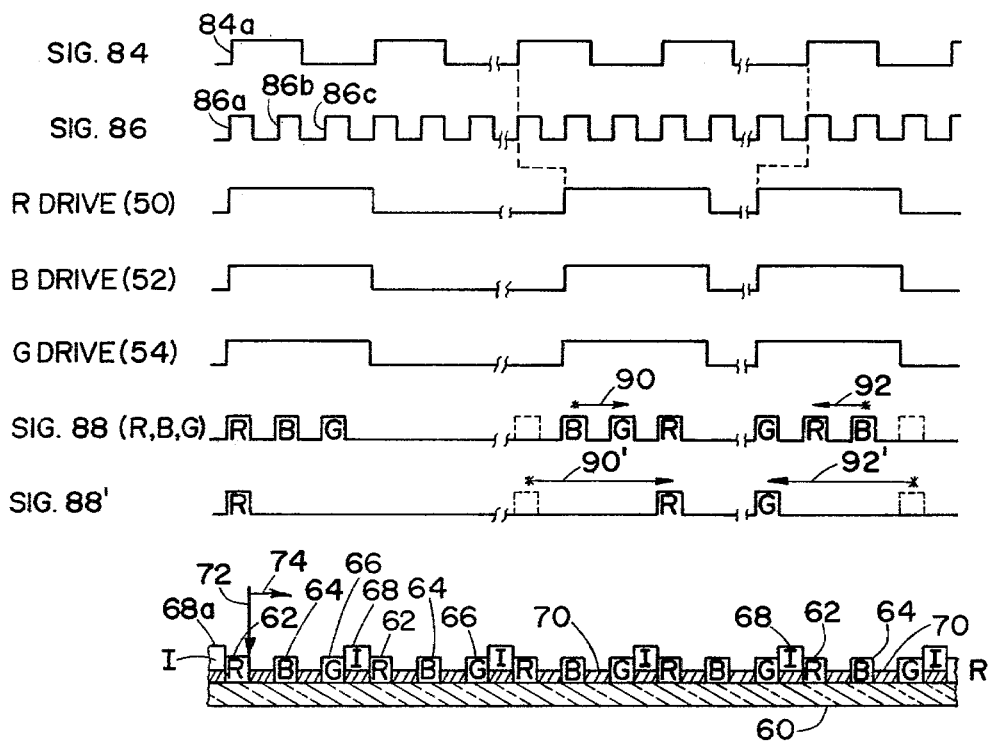
FIG. 2 is a detailed sectional view of the faceplate and display medium of the beam-index cathode-ray tube of the system of FIG. 1 together with certain signals occurring within the system during its operation.

As is the convention, the beam-index cathode-ray tube 26 includes beam-producing means 27 and beam-deflection means 28 for producing and directing, respectfully, a narrow focused electron beam 72 toward a display medium comprising a supportive faceplate 60, shown in cross-section in FIG. 2, over the interior surface of which is disposed a first spaced array of vertically oriented color phosphor bands 62, 64, 66 and a second spaced array of simiarily oriented index phosphor bands 68, with the index bands being arranged so as to have a predetermined periodically relationship with the color bands. The materials of the color bands 62, 64, 66 are chosen to produce, upon excitation by the electron beam 72, luminescence in the colors red, green, and blue, respectfully, and the material of the index bands is chosen to produce, upon similar excitation, luminescence in the ultra-violet range. (For ease of visualization, the color phosphor band 62, 64, 66 are labeled R, G, and B for the colors red, green, and blue, respectfully, and the index bands 68 are labled I for index.) Each color band is separated from its nearest color band neighbors by a guard band of black non-luminescent material, such material also shielding the index bands from a viewer on the opposite side of the faceplate 60.

Before addressing the indexed character generation feature of the present invention, it is necessary to review briefly the operation of a conventional beam-index color display system, that is, the system of FIG. 1 with the connection between the tracking filter 34 and the character generator 20 removed and the character generator timing control provided by a conventional periodic clock signal. As used herein, the term "character generator" is understood to include any devide capable of producing a required number of preselected video drive signals in response to the receipt of a digital pulse. During the operation of such a conventional system, the electron beam 72, the current density of which is maintained at a minimum background level at least sufficient to excite the index bands 68 irrespective of whether the beam density is also being modulated to produce a desired image, is caused to sweep repeatedly across the color bands 62, 64, 66 in a horizontal direction, indicated by the arrow 74 in FIG. 2, so as to define a raster-scan presentation. Each sweep of the beam 72 across an index band 68 causes a quantum of ultra-violet illumination (76 in FIG. 1) to be produced and reflected back from the faceplate 60 toward the photomultiplier tube 30 where it causes an index signal to be produced for amplification by the amplifier 32 and subsequent application to the input of the tracking filter 34. As indicated earlier, the tracking filter 34 is preferably of phase-locked-loop design and is employed to produce a relatively clean frequency-modulated (FM) control signal with a phase corresponding to that of the relatively noisy index signal. The FM signal of the tracking filter 34, still assuming a conventional system, is applied to the control input 36 of the electronic commutator 22, a conventional circuit depicted in the diagram of FIG. 1 as a rotating mechanical switch, so as to advance the commutator through one complete cycle of its operation for each pulse of ultra-violet illumination detected by the photomultiplier tube 30. Each advancement of the commutator 22 through a complete cycle causes the three color drive signals currently being produced by the character generator 20 to be sequentially selected and transmitted, via the amplifier 24, to the beam-generating means 27 of the tube 26 in a manner modulating the current density of the beam 72 with the selected red drive signal as the beam impinges the red phosphor band 62 and with the selected green or blue signal as the beam impinges a respective green or blue phosphor band 64 or 66. The problem with such a conventional system is that, the generation of the drive signals is timed by the system clock signal and the selection of the drive signals is timed by the index-related control signal, and there is therefore no assurance that the generation and selection are in timed synchrony with each other.

Consider now the system of the present invention, that is, the system of FIG. 1 with the output of the tracking filter 34 applied to both the control input 36 of the commutator 22 and the clock input 40 of the character generator 20. Consider also the curves of FIG. 2 in timed juxtaposition with the cross-sectional view of the faceplate 60 and associated display medium. Note that the curves are divided into left, middle, and right segments. Only the left segment is considered initially. The curve labeled SIG. 84 is the frequency-modulated control signal produced by the phase-locked-loop tracking filter 34, the curve labeled SIG. (86) is the signal produced by the multiplier circuit 38, the three curves labeled R DRIVE (50), B DRIVE (52), G DRIVE (54) are the video drive signals produced by the character generator 20 in response to the control signal SIG. 84, and the curve labeled SIG. 88 (R, B, G) is the video drive signals as selected by the commutator 22 in response to the signal SIG. 86 for transmission to the beam-producing means 27 of the display tube 26. The curve labeled SIG. 88' will be discussed later.

The juxtaposition of the curves of FIG. 2 with the cross-sectional representation of the faceplate 60 and its associated display medium is to indicate the timed relationship between the signals represented by the curves and the passage of the electron beam 72 over the color bands 62, 64, 66 and the index bands 68 of the display medium. In other words, as the beam 72 passes, for example, index band 68a, a pulse 84a of control signal 84 and a pulse 86a of signal 86 are produced, with pulse 84a causing the character generator 20 to produce the three drive signals 50, 52, 54 and pulse 86a causing the commutator 22 to select the first or red drive signal 50. Note that for ease of discussion the signal 86 produced by the multiplier circuit 38 has a frequency three times that of the control signal 84. This is to provide a separate pulse 86a, b, c for each incremental advancement of the commutator 22. It is recognized that the commutator 22 could be designed to advance through a complete three-step cycle for each pulse received and the multiplier circuit 38 eliminated. Note also that the three drive signals 50, 52, 54 are all assumed to be present for selection during a first cycle of signal 84 and absent during the next. In practice, the signals produced by the generator 20 are a function of an image to be produced and any combination of the three drive signals may be present at any given time, with a new set being produced in response to each pulse of the signal 84.

As can be seen from the curves of FIG. 2, the synchronous control of both the character generator 20 and the commutator 22 by the same frequency-modulated control signal ensures that both the generation of the video signals and their selection for display will occur in timed synchrony irrespective of minor variations in the phase of the control signal itself. Without such timed synchronization, variations in phase of the signal produced by the tracking filter 34, caused by non-linear spacing of the index bands 68 or by non-linear movement of the electron beam 72, would cause corresponding variations in the selection of the video drive signal without at the same time causing corresponding variations in the timing of their production. Thus, it would be possible to select a particular drive line before or after the associated drive signal has been produced. Such an occurrence is shown in the middle and right segments of the curve labeled SIG. 88 (R, B, G). In the middle segment of that curve, the phase of the control signal SIG. 84 from the tracking filter 34 leads somewhat the generation of the three color drive signals 50, 52, 54 with the result that the red drive signal 50 is selected a full period late, while in the right segment of the SIG. 88 (R, B, G) curve, the phase of SIG. 84 from the tracking filter lags somewhat the production of the three drive signals with the result that the green drive signal 54 is selected a full period early. The consequence of such late and early selection of the color drive signals is that the misselected signal causes an observable shift in the information represented thereby, as indicated by the arrows 90 and 92, and the introduction of moire patterns in the image being produced. Only by the concurrent generation and selection of the color drive signals can it be guaranteed that the drive signal will be present at the time required for its selection irrespectively of any slight phase shift in the control signal SIG. 84.

The consequences of such late and early selection of certain drive signals are even more pronounced when certain of the drive signals are absent. For example, if only the red drive signal 50 is present, its late selection, as indicated in the middle segment of the curve labeled SIG. 88' in FIG. 2, causes the information represented by the drive signal to be displaced a full display position to the right, as indicated by the arrow 90', while the early selection of the green drive signal 54 in the absence of the other two drive signals causes the information represented by the signal to be displaced a full display position to the left, as indicated by the arrow 92'. Such mispositioning of the single color display information can severely degrade the accuracy of an affected high resolution graphics display. Again, such mispositioning of graphics information is eliminated completely by the double quantization of the video drive signals effected by their concurrent generation and selection.

The terms and expressions which have been used in the foregoing specification are used therein as terms of description and not of limitation, and there is no intention, in the use of such expressions, of excluding equivalents of the features shown and described or portions thereof, it being recognized that the scope of the invention is defined and limited only by the claims which follow.

We claim as our invention:

1. A beam-index color display system comprising:
   (a) A beam-index cathode-ray tube including a display medium, means for producing an electron beam, and means for directing said beam toward said medium;
   (b) deflection means for causing said beam to sweep across said display medium;
   (c) means responsive to the presence of said electron beam for producing a beam-index signal representative of the position of said beam within said tube;
   (d) means responsive to said index signal for generating a digital bit stream defining an image to be displayed; and
   (e) means also responsive to said index signal for sequentially selecting successive bits of said bit stream in continuous timed synchrony with their generation and for transmitting said selected bits to said cathode-ray tube for conversion into a visual display representative of said image.

2. The beam-index color display system of claim 1 wherein said means (d) includes means responsive to said beam-index signal for generating a plurality of digital bit streams, each of which defines a differentiable characteristic of said image, and wherein said means (e) includes means also responsive to said beam-index signal for sequentially selecting a successive bit from each of said bit streams and for transmitting said selected bits, in the order of their selection, to said cathode-ray tube for said conversion.

3. The beam-index color display system of claim 1 wherein said beam-index signal comprises a series of digital pulses and wherein said means (d) comprises a digital character generator having means for receiving said beam-index signal and means for producing a successive bit of said digital bit stream in response to the receipt of each said digital pulse.

4. In a color display system including a beam-index cathode-ray tube, means for producing a beam-index signal, means for generating a plurality of digital drive signals defining an image to be displayed, and means responsive to said beam-index signal for sequentially selecting said drive signals for transmission to said tube, the improvement comprising means also responsive to said beam-index signal for causing said drive signals to be generated in continuous timed synchrony with their sequential selection.

5. A method of improving resolution and linearity in a beam-index display system, said method comprising the steps of:
   (a) generating a beam-index signal representative of the position of an electron beam within a cathode-ray display tube;
   (b) responsive to said beam-index signal, generating a digital bit stream defining an image to be displayed;
   (c) also responsive to said beam-index signal, sequentially selecting successive bits of said bit stream in continuous timed synchrony with their generation; and (d) transmitting said selected bits to said display tube for conversion into a visual representation of said image.

6. The method of claim 5 wherein said step (b) includes, responsive to said beam-index signal, generating a plurality of digital bit streams, each of which defines a differentiable characteristic of said image to be displayed, wherein said step (c) includes, also responsive to said beam-index signal, sequentially selecting a successive bit from each of said bit streams, and wherein said step (d) includes transmitting said selected bits, in the order of their selection, to said display tube for said conversion.

* * * * *